(12) United States Patent
Tatina et al.

(10) Patent No.: US 8,636,450 B2
(45) Date of Patent: Jan. 28, 2014

(54) TIE DOWN SYSTEM WITH WINCH AND GRATE OVERLAY PANEL

(75) Inventors: Richard A. Tatina, Countryside, IL (US); Robert J. Cencer, Tipton, MI (US)

(73) Assignees: Holland LP, Crete, IL (US); Trinity Industries Inc., Dallas, TX (US)

( * ) Notice: Subject to any disclaimer, the term of this patent is extended or adjusted under 35 U.S.C. 154(b) by 97 days.

(21) Appl. No.: 13/452,124

(22) Filed: Apr. 20, 2012

(65) Prior Publication Data

US 2013/0280001 A1  Oct. 24, 2013

(51) Int. Cl.
*B60P 3/06*  (2006.01)

(52) U.S. Cl.
USPC .............................................. 410/12; 410/98

(58) Field of Classification Search
USPC ................ 410/2–3, 7–12, 19–20, 23, 30, 50, 410/97–98, 100, 103
See application file for complete search history.

(56) References Cited

U.S. PATENT DOCUMENTS

| D346,258 | S | 4/1994 | Zankich | |
|---|---|---|---|---|
| 5,302,063 | A | 4/1994 | Winsor | |
| 5,312,213 | A | 5/1994 | Winsor | |
| 5,316,421 | A * | 5/1994 | Bullock et al. | 410/9 |
| 6,171,037 | B1 * | 1/2001 | Andre | 410/20 |
| 6,530,729 | B2 * | 3/2003 | Tatina | 410/7 |
| 6,851,523 | B1 | 2/2005 | Gaster | |
| 7,632,052 | B2 * | 12/2009 | Tatina | 410/20 |
| 8,047,751 | B2 * | 11/2011 | Powers et al. | 410/20 |
| 8,430,612 | B1 * | 4/2013 | Randall | 410/3 |
| 2002/0197126 | A1 * | 12/2002 | Tatina | 410/7 |
| 2008/0170923 | A1 * | 7/2008 | Tatina | 410/12 |
| 2008/0232919 | A1 | 9/2008 | Anderson et al. | |
| 2009/0003956 | A1 * | 1/2009 | Tatina | 410/20 |
| 2013/0216324 | A1 * | 8/2013 | Tatina | 410/3 |

* cited by examiner

*Primary Examiner* — Hilary Gutman
(74) *Attorney, Agent, or Firm* — Schiff Hardin LLP

(57) ABSTRACT

In a tie down system and method for securing a vehicle tire to a wire grate, a slotted overlay panel rest on top of the wire grate. A clevis assembly having one end of a tire trap assembly attached thereto is provided along with the winch assembly having a winch for receiving an opposite end of the tire strap assembly. Each of the clevis assembly and winch assembly have a T hook with a T portion which is insertable through a respective slot of the overlay panel.

16 Claims, 8 Drawing Sheets

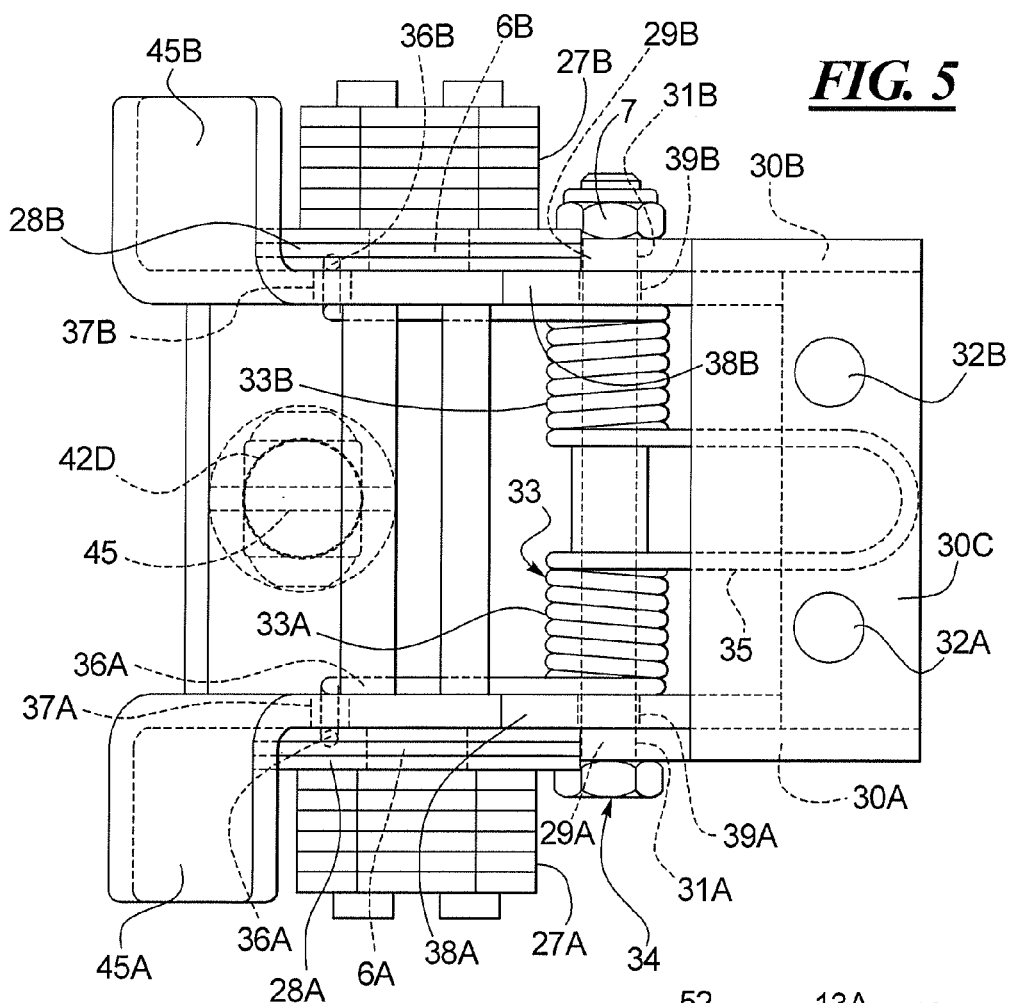
*FIG. 5*
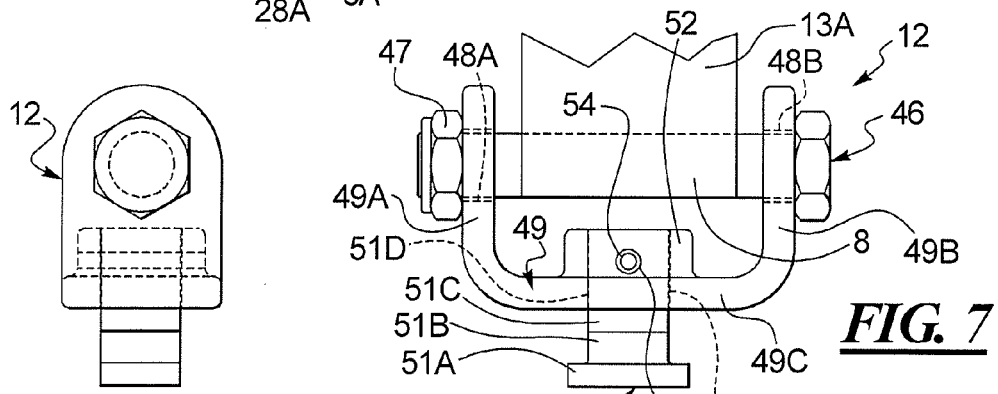
*FIG. 6*
*FIG. 7*
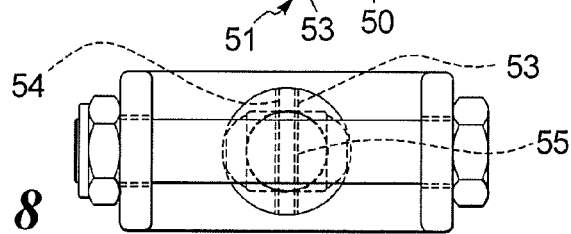
*FIG. 8*

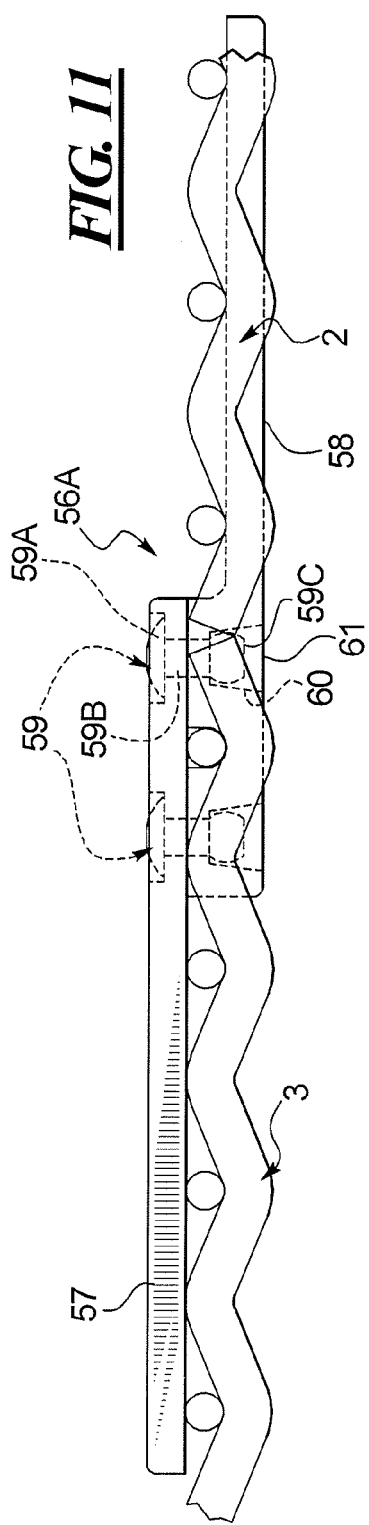
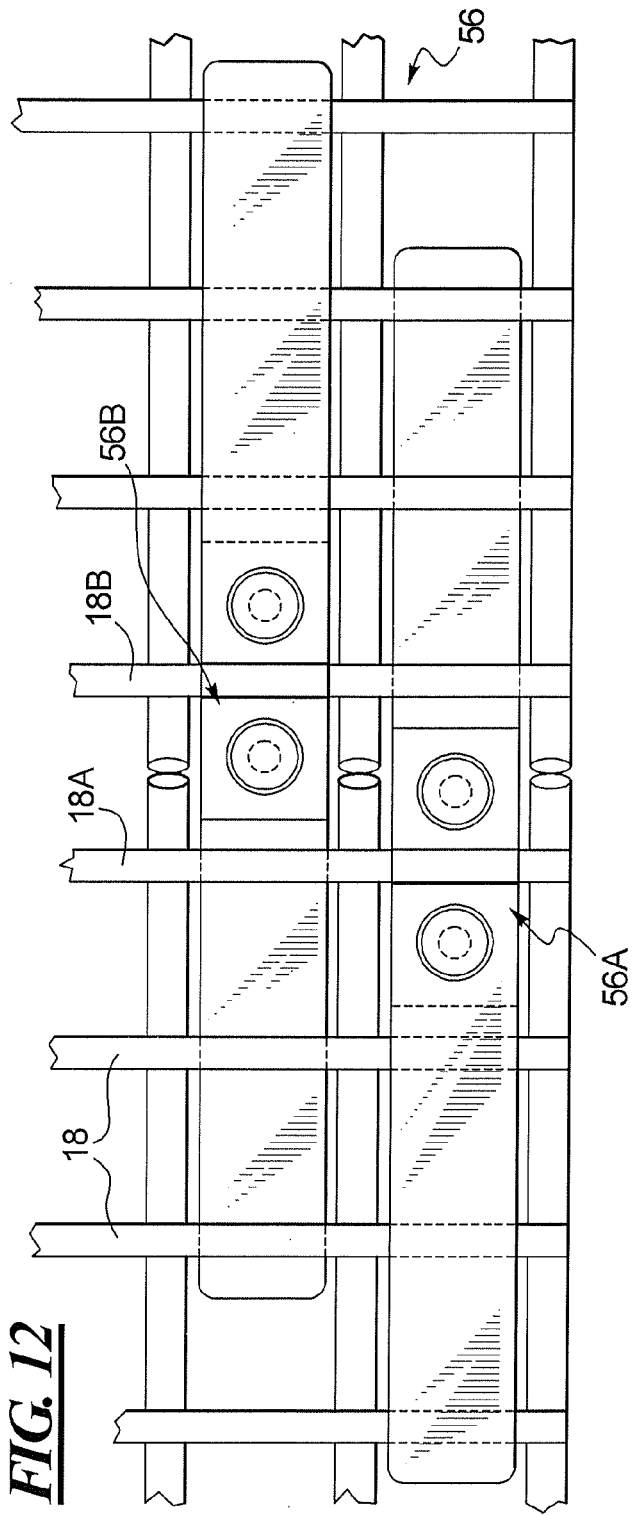

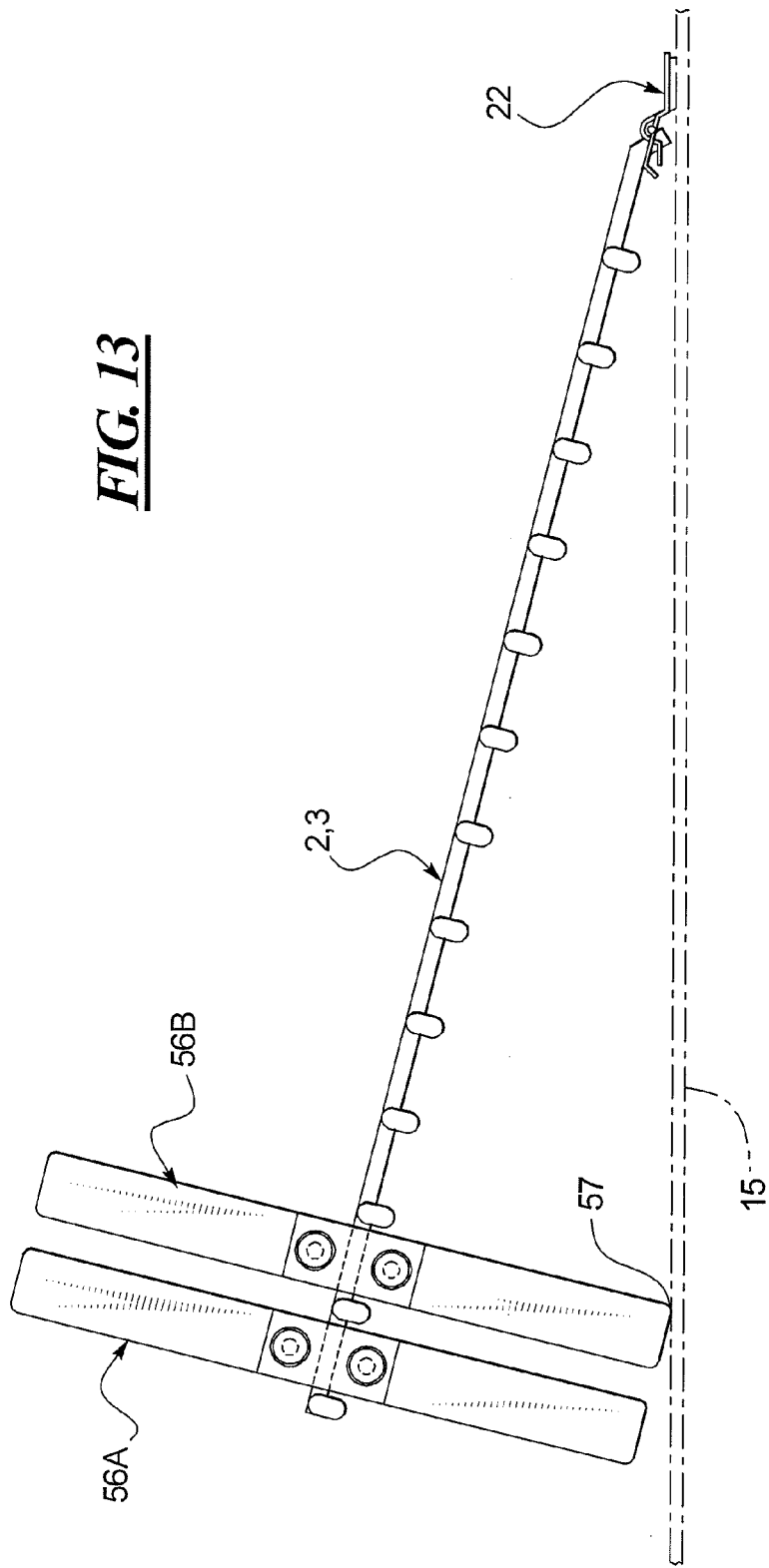

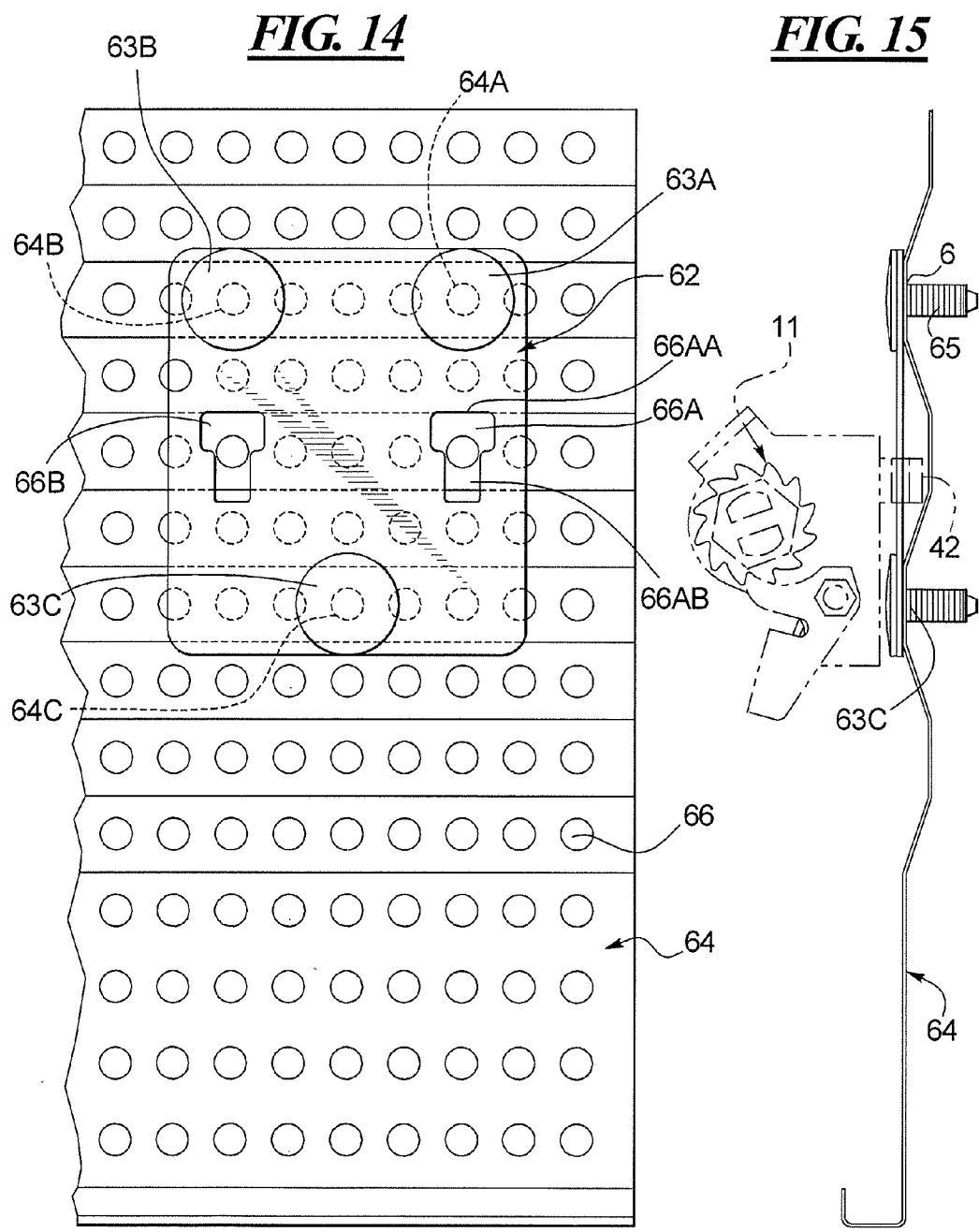

TIE DOWN SYSTEM WITH WINCH AND GRATE OVERLAY PANEL

BACKGROUND

It is known to provide in an automotive tie down system for transporting vehicles, such as by rail cars, to provide a wire grate formed of a mesh of first grate wires and second grate wires transverse to the first grate wires. It is also known to attach such a grate by use of hinges at one side so that the grate can be flipped up, such as for cleaning away dirt, snow, ice, or the like.

It is also known to provide such grates in a plurality of sections so that they are aligned end to end.

It is further known to provide a securement assembly for securing one end of a tie strap to a wire grate and which passes over a tire of the vehicle being secured to the grate, and wherein the opposite end of the tie strap engages with a winch assembly also secured to the grate.

SUMMARY

It is an object to provide an improved tie down system for use with a wire grate but which provides improved security, tie down performance, and adaptability. Also, it may be desirable to provide an automatic release of the system when excessive forces are applied to the vehicle during transport.

In a tie down system and method for securing a vehicle tire to a wire grate, a slotted overlay panel rest on top of the wire grate. A clevis assembly having one end of a tire trap assembly attached thereto is provided along with the winch assembly having a winch for receiving an opposite end of the tire strap assembly. Each of the clevis assembly and winch assembly have a T hook with a T portion which is insertable through a respective slot of the overlay panel.

BRIEF DESCRIPTION OF THE DRAWINGS

FIG. 5 is a top view of the winch assembly of FIG. 3;

FIG. 6 is a side view of a clevis assembly used in the tie down system of FIG. 1;

FIG. 7 is an end view of the clevis assembly of FIG. 6;

FIG. 8 is a top view of the clevis assembly of FIG. 6;

FIG. 11 is a side view of a grate interlock assembly for connecting first and second grate sections end to end as may be employed in the system shown in FIG. 1;

FIG. 12 is a top view of the grate interlock assembly of FIG. 11;

FIG. 13 is a side view showing the grate interlock assembly rotated for holding the grate in a pivoted upward position for removal of debris;

FIG. 14 is a front view of a storage bracket for storing clevis assemblies and winch assemblies used in the system of FIG. 1; and FIG. 15 is a side view of the storage bracket of FIG. 14 and illustrating a stored winch assembly.

DESCRIPTION OF EXEMPLARY PREFERRED EMBODIMENT

Figure 1:
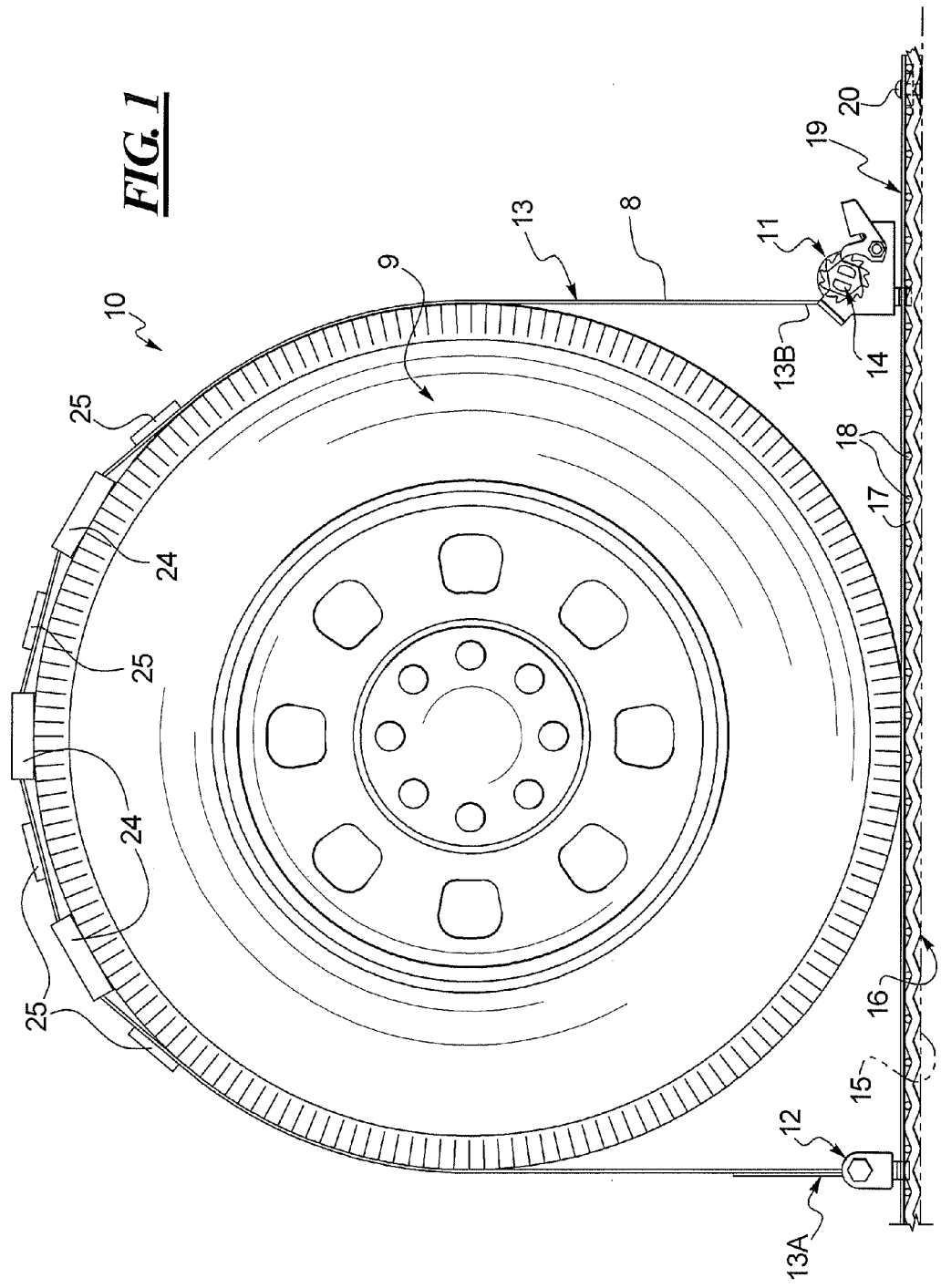
FIG. 1 is a side view of the improved vehicle tie down system.

For the purposes of promoting an understanding of the principles of the invention, reference will now be made to the preferred exemplary embodiment/best mode illustrated in the drawings and specific language will be used to describe the same. It will nevertheless be understood that no limitation of the scope of the invention is thereby intended, and such alterations and further modifications in the illustrated embodiment and such further applications of the principles of the invention as illustrated as would normally occur to one skilled in the art to which the invention relates are included.

FIG. 1 illustrates in a side view the improved tie down system 10 according to a preferred exemplary embodiment. The system comprises a winch assembly 11, a clevis assembly 12, and a tire strap assembly 13 placed over a vehicle tire 9, and having one end attached to the clevis assembly 12 and the other end wound onto a split mandrel 26 of a winch 14 of the winch assembly 11.

A load bearing surface 15 such as on a rail car supports a wire grate 16 formed of first parallel grate wires 17 and second parallel grate wires 18 transverse to the first grate wires 17.

As shown in the side view of FIG. 1, a slotted overlay panel 19 rests on top of the wire grate 16. This overlay panel 19 may be attached to the grate 16 by a plurality of fastener assemblies 20 described in greater detail hereafter. Alternatively, however, the overlay panel 19 may be attached by a hinge 21 schematically shown in dash lines which may, for example, be positioned somewhat outwardly of an existing outer hinge 22 pivotably connecting the grate 16 to the load surface 15 serving for transport. In this case, an outward edge shown in dash lines of the overlay panel 19 would extend to the hinge 21. If the hinge 21 is not used, then the outer edge of the overlay panel 19 terminates as shown at 23.

Figure 2:
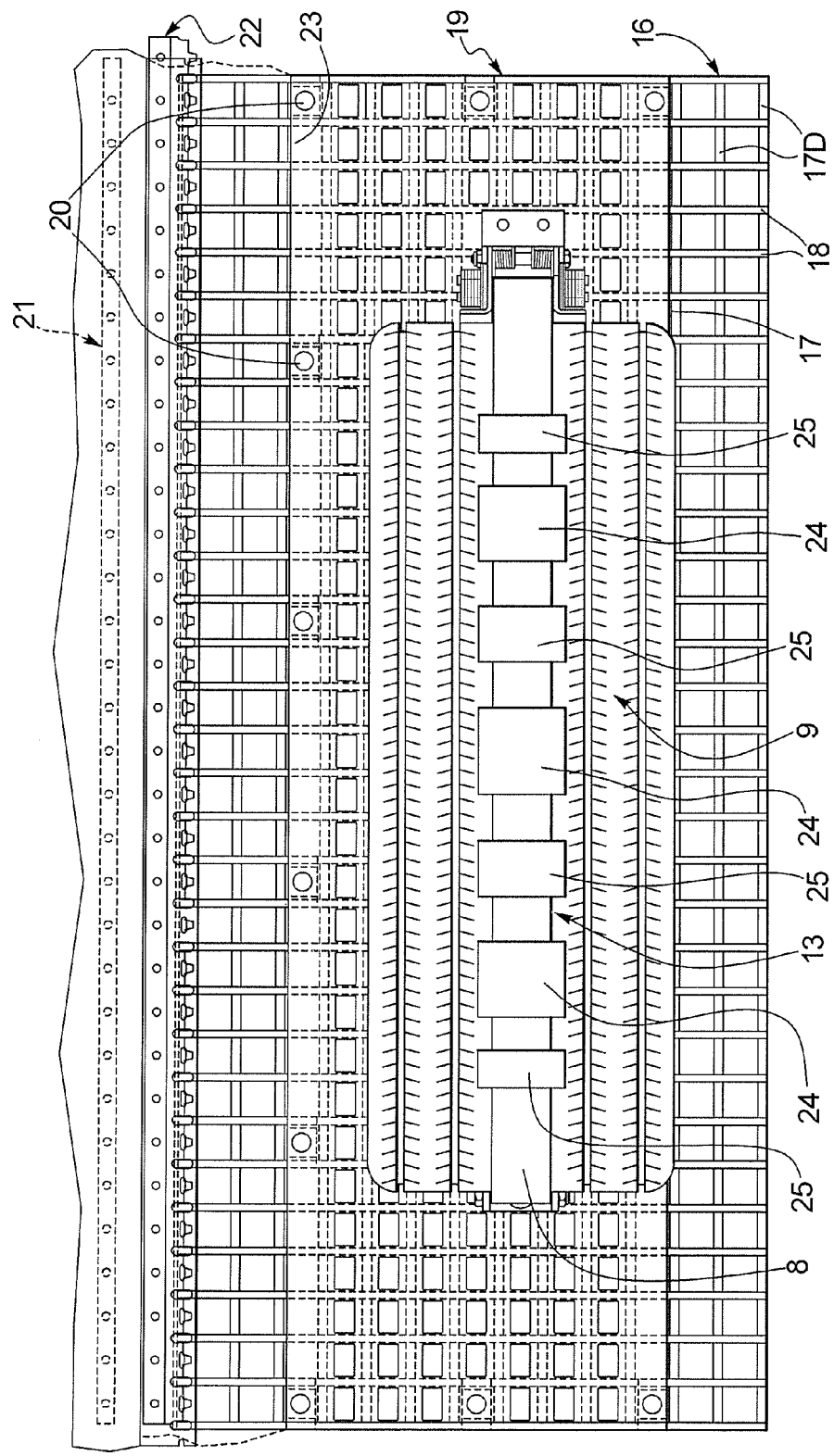
FIG. 2 is a top view of the vehicle tie down system of FIG. 1.

As shown most clearly in FIG. 2, the strap assembly 13 overlies the tire 9 and has a plurality of cleats 24 and blocker elements 25. The cleats are preferably rubber. The strap assembly 13 is preferably formed of a strap 8 which is a polyester webbing.

At one end of the strap 8, a loop is formed at 13A attached to the clevis assembly 12.

Figure 3:
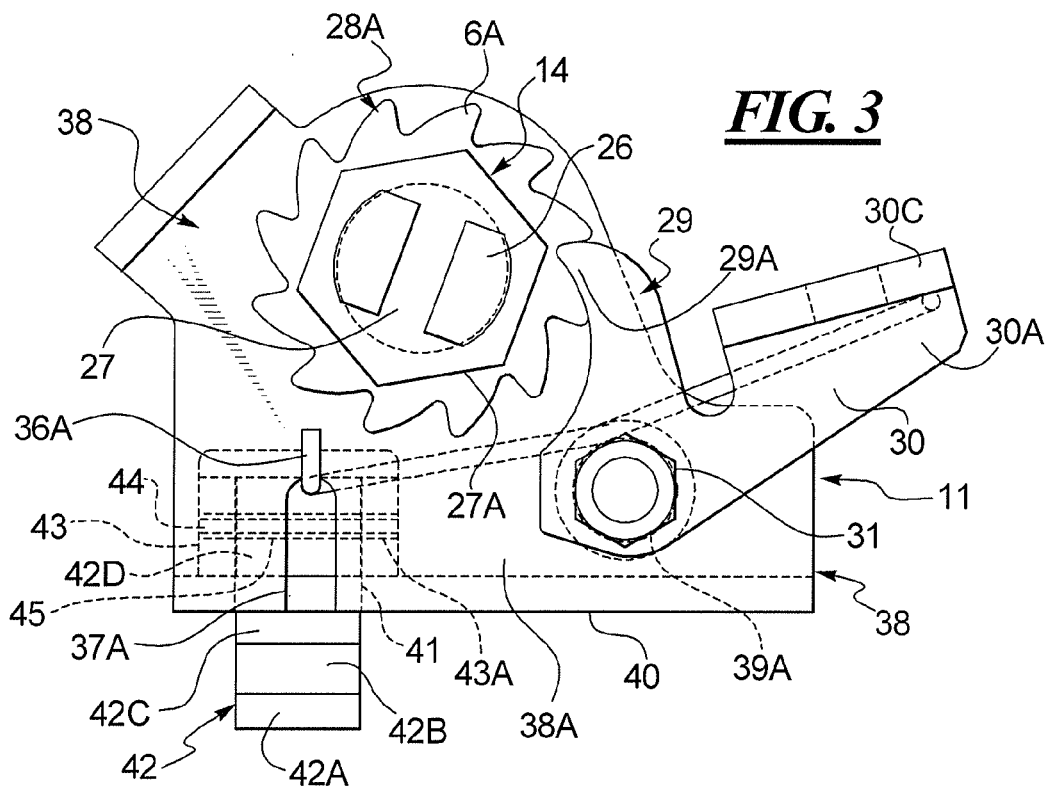
FIG. 3 is a side view of a winch assembly used in the system of FIG. 1.
Figure 4:
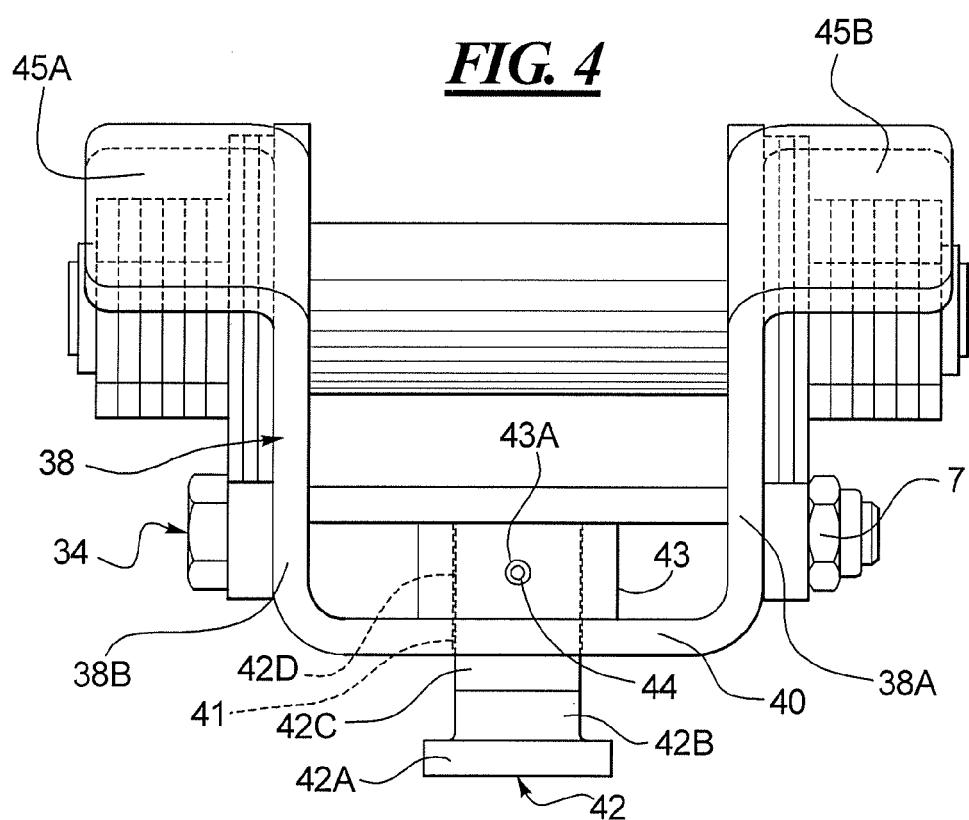
FIG. 4 is an end view of the winch assembly of FIG. 3.

FIGS. 3, 4 and 5 show views of the winch assembly 11 having the winch 14. The winch is compact in size and has the split mandrel 26 with a slot 27 for receiving the second end 13B of the strap assembly. The winch 14 is tightened with a socket wrench received on socket engagement ends at either 27A or 27B at opposite sides of the winch assembly (see FIG. 5). The winch 14 is held in position by a ratchet gears 28A, 28B and pawl 29 which engage teeth 6A, 6B of ratchet gears 28A, 28B by use of engagement fingers 29A, 29B. The pawl 29 comprises arms 30A, 30B having apertures 31A, 31B in each of side portions 30A and 30B of the arm 30. A push surface portion 30C bridges between the side portions 30A and 30B. Apertures 32A and 32B are provided in push surface portion 30C.

The spring assembly 33 as most clearly shown in FIG. 5 has coil portions 33A, 33B on a bolt 34, and is provided to bias the push surface 30C in an upwardly direction so that the engagement fingers 29A and 29B of the pawl 29 engage with the teeth 6A, 6B and remain there unless the push surface is pushed outwardly for releasing the respective fingers from the teeth.

To accomplish the aforementioned biasing, the spring assembly 33 has a U-shaped arm 35 pushing upwardly against the bottom surface of the push surface portion 30C. Spring ends 36A and 36B are received in respective notches 37A and 37B of a frame 38 of the winch assembly.

The frame 38 has respective apertures 39A and 39B receiving bolt 34 in side walls 38A and 38B.

A bottom portion 40 of the frame 38 has a circular aperture 41 for receiving a T hook 42 having a T portion 42A, a rectangular portion 42B, and a round portion 42C. Round portion 42C is part of an upper shaft portion 42D which passes through the aperture 41 of the bottom portion 40 and into a collar 43 extending up from the bottom portion 40 of the frame 38 where it is attached, for example by welding. The collar 43 has an aperture 43A for receiving a shear pin 44 which also passes through an aperture 45 of the upper shaft 42D. The shear pin has a desired break strength such that when excessive forces are applied to the vehicle, for example during transport, the winch assembly can break free from the shaft portion 42D and thus release the tie down forces exerted via the tie down strap on the vehicle tire. For example, the shear pin may be designed to fail when a force of approximately 2,000 pounds occurs in the webbing strap due to train action or coupling impacts. Forces that exceed 2,000 pounds that reach the automobile can cause what certain automotive engineers refer to as "hidden damage"—that is damage which is not visible but can cause premature problems in the vehicle later on.

As shown in the top view of FIG. 5, a locknut 7 secures the bolt 34 to the frame 38.

The frame 38 also has outwardly extending ears 45A and 45B as shown in FIGS. 4 and 5 which provide a flat surface should the winch come in contact with the tire 9.

FIGS. 6, 7, and 8 show the clevis assembly 12 for retaining the first looped end 13A of the strap 8. This loop end passes around a bolt 46 secured by a lock nut 47 received through respective apertures 48A and 48B of a U-shaped frame 49 having side portions 49A and 49B. A bottom portion 49C has an aperture 50 receiving a T hook 51 having a T portion 51A, a rectangular portion 51B, a round portion 51C, and an upper shaft portion 51D. The upper shaft portion 51D is received in a collar 52 extending upwardly from an upper surface of the bottom portion 49C and is attached thereto, for example, such as by welding. The collar 52 has an aperture 53 receiving a shear pin 54. The shear pin 54 also passes through an aperture 55 in the upper shaft portion 51D. The shear characteristics of the shear pin 54 are just like the shear characteristics previously described for the shear pin 44 on the winch assembly. Also, the design of the T hook 51 is preferably the same as the design of the T hook 42 of the winch assembly.

Mounting of the clevis assembly and mounting of the winch assembly onto the grate overlay panel is the same. To mount the winch or clevis assembly, the T portion is inserted into a slot of the slotted overlay panel which is nearest to a center line of the vehicle tire 9 and in line with an extended tangent of an outside diameter of the tire. Then the winch or clevis assembly is rotated by 90 degrees while the rounded portion of the T hook is present at the respective slot. Note in FIG. 2 that the slots are arranged in rows and columns. Thereafter, when the winch or clevis assembly is pulled upwardly during winching, the rectangular portion is entrained or confined by the side walls of the rectangular portion of the respective T hook so that it will not turn during winching to tighten the strap assembly.

Preferably the clevis assembly previously attached to the loop of the strap assembly is first inserted into the corresponding slot, then the strap assembly is passed over the top of the tire, and then the free end of the strap is assembly inserted into the slotted mandrel. When the mandrel is wound by the socket wrench, the end of the strap assembly tightens upon itself.

Figure 9:
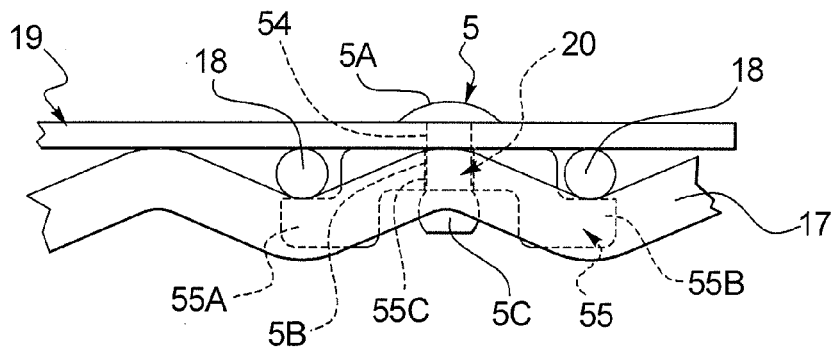
FIG. 9 is a side view of a fastener used for securing a slotted overlay panel onto a wire grate in the system of FIG. 1.
Figure 10:
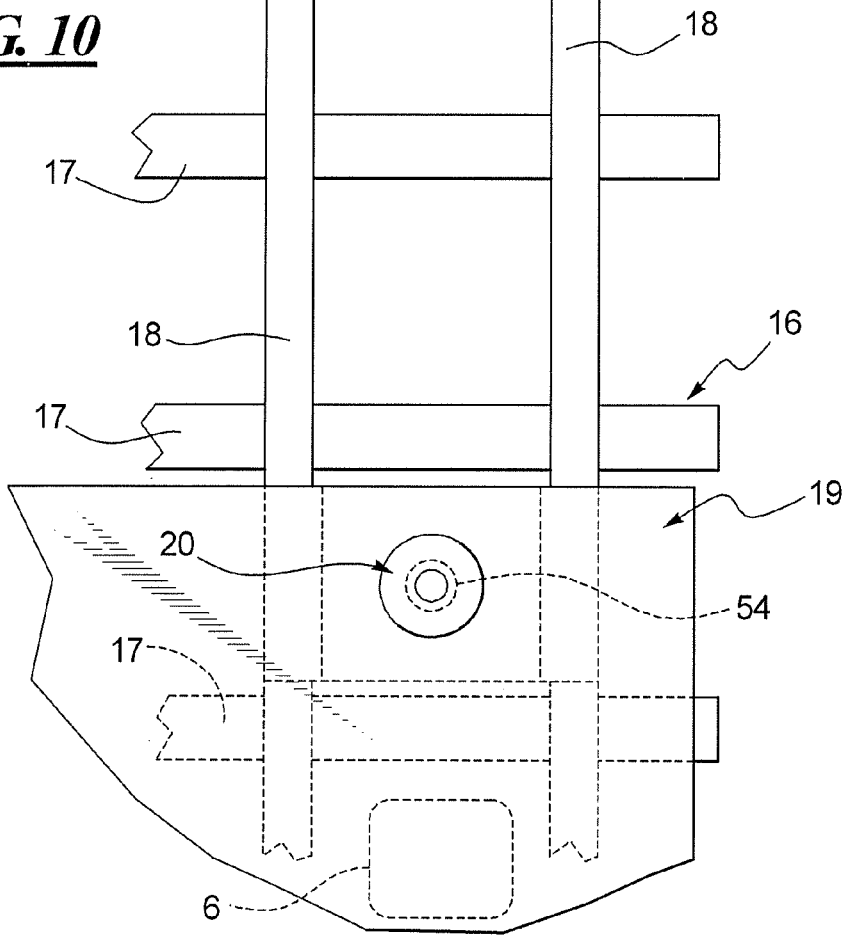
FIG. 10 is a top view of FIG. 10.

The construction of the fastener assembly 20 for retaining the overlay panel on the wire grate is shown in FIGS. 9 and 10. In the side view of FIG. 9, a fastener keeper bracket 55 has respective engagement ears 55A, 55B engaging with the respective transverse second grate wires 18. These grate wires 18 overlie the downwardly extending V shaped portions of the first grate wires 17.

The keeper bracket 55 has a central aperture 55C for receiving a rivet-like member also known as a blind rivet fastener 5 having a head 5A, a shaft portion 5B, and an end expanded portion 5C which holds the fastener keeper bracket 55 in place. The rivet shaft portion 5B passes through a respective aperture 54 in the slotted overlay panel 19 where a slot 6 is not present.

FIGS. 11 and 12 illustrate a grate interlock assembly 56 which connects together adjacent ends of adjacent grate sections 2 and 3. As shown, fastener assemblies 59 similar to the fasteners assemblies 20 for the overlay panel shown in FIGS. 9 and 10 are employed.

As may be appreciated from FIGS. 11 and 12, the overall grate interlock assembly 56 is formed of a first grate interlock assembly 56A and a second grate interlock assembly 56B, each of which is formed of its own respective upper first grate interlock bar 57 and lower second grate interlock bar 58. The upper and lower grate interlock bars 57 and 58 are attached by the rivet-like fastener assemblies 59 having the upper head portion 59A, shaft portion 59B, and expanded portion 59C. The expanded portion 59C is received in a respective conical shaped depression 60 in the second portion 61 of the lower interlock bar 58.

As maybe further appreciated from observation of FIGS. 11, 12, and 13, the first grate interlock assembly member 56A rotates about transverse grate wire 18A and the second grate wire interlock assembly member 56B rotates about the adjacent transverse grate wire 18B. Thus, with the grate wire sections 2 and 3 pivoted transverse to the grates, the grate sections 2 and 3 are retained in an upwardly sloped pivoted position on the hinge 22 as shown in FIG. 13. The members 56A and 56B may be rotated in place for interlocking and then both grate sections 2 and 3 may be pivoted down on top of the load surface 15 shown in FIGS. 1 and 13. Thus as illustrated in FIG. 13, the grate interlock assembly members 56A and 56B are shown rotated such that the longitudinal extent is downwardly toward the respective grate sections 2 and 3. In this orientation, one may see that the end 57 of member 56B abuts against the load surface 15 so that debris such as dirt, snow, ice, or the like may be removed beneath the grate. In this configuration, one can see the grates 2 and 3 are pivoted about the grate hinge 22 mentioned above in connection with FIG. 2.

The grate interlocks have been designed and added at the joints between the grate sections to convey the vertical forces from one grate section to the adjacent grate section. The grate interlock assembly also provides a support for the respective two adjacent grate sections and overlay panel previously described when it is necessary to raise the grate with the respective overlay panel for the aforementioned cleaning of debris such as ice, snow, or dirt.

FIGS. 14 and 15 illustrate a storage bracket 62 for use in storing a plurality of the clevis assemblies and winch assemblies. The storage bracket 62 is mounted by fasteners 63A, 63B, 63C through respective apertures 64A, 64B, 64C in the bracket 62. They comprise pushable engagement members having threads 65 such as shown in FIG. 15 engaging with respective apertures 66 in a rail car apertured sidewall 64. One of the winch assemblies 11 is shown engaged by its respective T hook 42 in a slot 66A in the bracket 62, said slot having enlarged portion 66AA and a narrower portion 66AB.

Although a preferred exemplary embodiment is shown and described in detail in the drawings and in the preceding specification, it should be viewed as purely exemplary and not as limiting the invention. It is noted that only a preferred exemplary embodiment is shown and described, and all variations and modifications that presently or in the future lie within the protective scope of the invention should be protected.

We claim as our invention:

1. A tie down system for securing a vehicle tire to a wire grate having a plurality of first parallel grate wires and a second plurality of parallel grate wires transverse to the first grate wires, comprising:
    a slotted overlay panel for resting on top of and being secured relative to said wire grate, said overlay panel having a plurality of rectangular slots arranged in rows and columns;
    a clevis assembly having one end of a tire strap assembly attached thereto;
    a winch assembly having a winch with a mandrel for receiving an opposite end of the tire strap assembly; and
    each of said clevis assembly and said winch assembly having a T hook with a rectangular T portion at one end, a rectangular portion upwardly from said T portion, a rounded portion upwardly from said rectangular portion, and an upper shaft portion received and retained in a retaining aperture at a floor portion of a frame of said winch assembly and said clevis assembly.

2. The system of claim 1 wherein said retaining aperture is located in a securement member extending upwardly from said floor portion and has an aperture therein receiving a shear pin, said shear pin also passing through an aperture in said upper shaft portion of said T hook.

3. The system of claim 2 wherein said securement member comprises a collar.

4. The system of claim 2 wherein said shear pin has a shear force related to forces being exerted to the vehicle during transport which are excessive such that said shear pin will shear when such excessive forces are applied to said vehicle.

5. The system of claim 2 wherein said excessive force is in excess of 2000 pounds in a web strap of said tire strap assembly.

6. The system of claim 1 wherein said winch comprises a pawl tooth engageable with teeth of a gear attached to said mandrel, said mandrel being a split mandrel with a slot.

7. The system of claim 1 wherein said clevis assembly comprises a U-shaped frame with a bolt passing through upwardly extending side walls of the frame, said bolt also passing through a loop at said one end of said strap assembly.

8. The system of claim 1 wherein said overlay panel is attached to said wire grate by a plurality of fastener assemblies.

9. The system of claim 1 wherein said overlay panel is attached to a hinge permitting pivoting of the overlay panel away from, or down on top of, said wire grate.

10. The system of claim 1 wherein a grate interlock assembly is provided for interlocking first and second grate sections of said wire grate at abutting ends, said grate interlock assembly comprising a first grate interlock assembly member and a second grate interlock assembly member, each of said first and second grate interlock assembly members comprising a respective upper first grate interlock bar and a respective mating lower second grate interlock bar, the first and second bars being attached by respective fastener assemblies, the first grate interlock assembly member being attached to and rotatable about a wire of the first grate section and the second grate interlock assembly member being attached to and rotatable about a wire of the second grate section.

11. The system of claim 1 wherein a grate interlock assembly is provided for interlocking first and second grate sections of said wire grate at abutting ends, said grate interlock assembly comprising a first grate interlock assembly member and a second grate interlock assembly member, said first grate interlock assembly member being attached to and rotatable about a wire of the first grate section and the second grate interlock assembly member being attached to and rotatable about a wire of the second grate section.

12. The system of claim 1 wherein a storage bracket is provided for securement to a wall of a transport car having said wire grate on a supporting surface of the transport car, said storage bracket having a slot for receiving said T hook of said clevis assembly or said winch assembly.

13. A tie down system for securing a vehicle tire to a wire grate having a plurality of first parallel grate wires and a second plurality of parallel grate wires transverse to the first grate wires, comprising:
    a slotted overlay panel for resting on top of and being secured relative to said wire grate, said overlay panel having a plurality of rectangular slots arranged in rows and columns;
    a clevis assembly having one end of a tire strap assembly attached thereto;
    a winch assembly having a winch with a mandrel for receiving an opposite end of the tire strap assembly; and
    each of said clevis assembly and said winch assembly having a T hook with a rectangular T portion at one end, and an upper shaft portion received and retained in a retaining aperture at a floor portion of a frame of said winch assembly and said clevis assembly.

14. A method for securing a vehicle tire to a wire grate having a plurality of first parallel grate wires and a plurality of second parallel grate wires transverse to the first grate wires, comprising the steps of:
    providing a slotted overlay panel for resting on top of and being secured relative to said wire grate, the overlay panel having a plurality of rectangular slots arranged in rows and columns;
    providing a clevis assembly having one end of the tire strap assembly attached thereto;
    providing a winch assembly having a winch with a mandrel for receiving an opposite end of the tire strap assembly;
    providing each said clevis assembly and said winch assembly with a T hook having a rectangular T portion at one end, a rectangular portion upwardly from said T portion, a rounded portion upwardly from said rectangular portion, and an upper shaft portion received and retained in a retaining aperture at a floor portion of a frame of said winch assembly and said clevis assembly; and
    attaching said clevis assembly to said wire grate by inserting the T hook through a respective slot of said wire grate adjacent said tire, rotating the clevis assembly by substantially 90 degrees, positioning said strap assembly over said tire and also inserting said T hook of said winch assembly through a respective slot adjacent said tire and rotating the winch assembly by substantially 90 degrees, then engaging an end of the strap assembly to the mandrel and then winding the mandrel to tighten the strap assembly.

15. A method for securing a vehicle tire to a wire grate having a plurality of first parallel grate wires and a plurality of second parallel grate wires transverse to the first grate wires, comprising the steps of:

providing a slotted overlay panel for resting on top of and being secured relative to said wire grate, the overlay panel having a plurality of rectangular slots arranged in rows and columns;

providing a clevis assembly having one end of the tire strap assembly attached thereto;

providing a winch assembly having a winch with a mandrel for receiving an opposite end of the tire strap assembly;

providing each said clevis assembly and said winch assembly with a T hook having a rectangular T portion at one end, and an upper shaft portion received and retained in a retaining aperture at a floor portion of a frame of said winch assembly and said clevis assembly; and attaching said clevis assembly to said wire grate by inserting the T hook in through a respective slot of said wire grate adjacent said tire, rotating the clevis assembly by substantially 90 degrees, positioning said strap assembly over said tire and also inserting said T hook of said winch assembly through a respective slot adjacent said tire and rotating the winch assembly by substantially 90 degrees, then engaging an end of the strap assembly to the mandrel and then winding the mandrel to tighten the strap assembly.

16. A tie down system for securing a vehicle tire to a wire grate having a plurality of first parallel grate wires and a second plurality of parallel grate wires transverse to the first grate wires, comprising:

a slotted overlay panel for resting on top of and being secured relative to said wire grate, said overlay panel having a plurality of rectangular slots arranged in rows and columns;

a clevis assembly having one end of a tire strap assembly attached thereto;

a winch assembly having a winch with a mandrel for receiving an opposite end of the tire strap assembly;

each of said clevis assembly and said winch assembly having a T hook with a rectangular T portion at one end retained at a floor portion of a frame of said winch assembly and said clevis assembly; and a grate interlock assembly for locking together first and second grate sections of said wire grate at abutting ends, said grate interlock assembly comprising a first grate interlock assembly member and a second grate interlock assembly member, the first grate interlock assembly member being attached to a wire of the first grate section and the second grate interlock assembly member being attached to a wire of the second grate section.

\* \* \* \* \*